United States Patent [19]

Hasegawa

[11] Patent Number: 4,735,663

[45] Date of Patent: Apr. 5, 1988

[54] METHOD AND APPARATUS FOR BONDING A PRINTING PLATE TO A FLEXIBLE ENDLESS PRINTING BELT

[75] Inventor: Kazumi Hasegawa, Komaki, Japan

[73] Assignee: Isowa Industry Co:, Ltd., Nagoya, Japan

[21] Appl. No.: 42,347

[22] Filed: Apr. 24, 1987

[30] Foreign Application Priority Data

Apr. 25, 1986 [JP] Japan ................................. 61-97484

[51] Int. Cl.[4] ............................................. G01B 11/00

[52] U.S. Cl. ............................. 156/64; 101/DIG. 12; 156/378; 156/379

[58] Field of Search ................. 156/64, 378, 379, 443, 156/184, 187, 446; 101/DIG. 12

[56] References Cited

U.S. PATENT DOCUMENTS 4,451,309 5/1984 Cauldwell .................. 101/DIG. 12
4,613,395 9/1986 Hasegawa .................. 101/DIG. 12

FOREIGN PATENT DOCUMENTS 59-38063 1/1984 Japan .......................... 101/DIG. 12
59-148665 8/1984 Japan .......................... 101/DIG. 12
908431 10/1962 United Kingdom .
967880 8/1964 United Kingdom .
1414959 11/1975 United Kingdom .

*Primary Examiner*—David Simmons
*Attorney, Agent, or Firm*—Fleit, Jacobson, Cohn & Price

[57] ABSTRACT

The present invention is directed to a method and apparatus for bonding a printing plate to a flexible endless printing belt passed around and between a plate cylinder and an adjustable cylinder. Marked on the surface of the printing belt are a first reference line perpendicular to a center line of the printing belt and a second reference line parallel to said center line. Set below the transparent plate is a third reference line parallel to the longitudinal reference line. A turned over printing plate is placed on said transparent plate at an intersection of the third and transverse reference lines and has an adhesive on its rear surface. The first marked reference line on the surface of the printing belt is aligned vertically with said transverse reference line. The plate cylinder is rotated to bring the first marked reference line to a position just above said transverse reference line. The transparent plate is moved to bring said printing plate into contact with the printing belt, and the printing belt and the transparent plate are moved first in one direction and then in the other from the position of alignment between the first reference line of the printing belt and the transverse reference line in a synchronized relation with each other to bond the printing plate to the printing belt by adhesive.

5 Claims, 10 Drawing Sheets

14
33
11
9
68
72
73
L1
L2
L3
Y
Y1
X
X1
C
α

METHOD AND APPARATUS FOR BONDING A PRINTING PLATE TO A FLEXIBLE ENDLESS PRINTING BELT

BACKGROUND OF THE INVENTION

This invention relates to a method and apparatus for bonding a printing plate onto an endless printing belt.

There has been well known a belt-type printing machine which is capable of varying lengths of printing without being restricted to a circumferential length of a plate cylinder. As shown in FIG. 14 of the accompanying drawings, the belt-type printing machine comprises a plate cylinder 11, an adjustable cylinder 14 spaced apart from the plate cylinder 11 for adjusting a distance from the plate cylinder 11, an endless printing belt 33 made of a flexible sheet of synthetic resin and passed around the cylinders 11 and 14, the printing belt 33 having a printing plate 68 bonded onto the upper surface of the printing belt 33, and an impression cylinder 65 cooperating with the printing belt around plate cylinder 11 to produce printing on a continuous sheet of paper 70 by the printing plate 68 during travel of the printing belt.

In this belt-type printing machine, there is a need for precisely bonding the printing plate 68 onto the printing belt 33 at its required position. To this end, it has been practice that heretofore making is manually made on the printing belt 33 at positions in which the printing plates are adhered to the belt. This marking operation requires experience and skills and a long time is required to position the printing plates one by one at their required places on the belt. This reduces efficiency of operation of preparation for printing.

Therefore, a main object of the invention is to provide a method and apparatus for bonding printing plate onto an endless printing belt for a belt-type printing machine, in which the printing plate can be efficiently precisely bonded to the printing belt in a mechanical manner without any need for skill and within less time required for preparation of the printing belt.

SUMMARY OF THE INVENTION

This object is achieved by providing a method for bonding a printing plate to a flexible endless printing belt passed around and between a plate cylinder and an adjustable cylinder, the later being arranged to be capable of adjusting a distance between their axes, said printing belt having a longitudinal center line on the upper surface thereof, comprising employing a transparent plate disposed below the printing belt and having on its surface longitudinal and transverse reference lines perpendicular to each other, said longitudinal reference line being positioned to align vertically with said center line of the printing belt, marking on the surface of the printing belt a first reference line perpendicular to said center line of said printing belt and a second reference line parallel to said center line and spaced apart a required distance from said center line, setting below the transparent plate a third reference line parallel to said longitudinal reference line of the transparent plate and at a distance equal to said required distance between said center line and said second reference line of said printing belt, placing a turned over printing plate on said transparent plate at an intersection of said third and transverse reference lines, said printing plate having on its rear surface adhesive means, aligning vertically said first marked reference line on said surface of said printing belt with said transverse reference line on the surface of said transparent place, rotating said plate cylinder to bring said first marked reference line to a position just above said transverse reference line moving said transparent plate relative to said printing belt to bring said printing plate into contact with said printing belt, and moving said printing belt and said transparent plate first in one direction and then in the other from the position of alignment between said first reference line of the printing belt and the transverse reference line of the transparent plate in a synchronized relation with each other to bond the printing plate to the printing belt by the adhesive means.

There is also provided an apparatus for carrying out said method for bonding the printing plate to the flexible endless printing belt comprising a belting assembly rotatively driven clockwise or counterclockwise and including a plate cylinder, an adjustable cylinder arranged to be capable of adjusting a distance between axes of said cylinders and said printing belt passed around and between said plate and adjustable cylinders, said printing belt having on its surface a longitudinal center line, a horizontal transparent plate disposed below said belting assembly for the printing plate thereon, said transparent plate having on its surface longitudinal and transverse reference lines perpendicular to each other, said longitudinal reference line aligning vertically with said center line of the belt, means for moving horizontally, said transparent plate relative to said belting assembly, means for moving vertically said transparent plate toward and away from the belting assembly, a third reference line disposed below said transparent plate and adapted to be movable toward and away from said longitudinal reference line of said transparent plate in parallel therewith, and a marking assembly disposed above said belting assembly and movable in a direction perpendicular to the center line of the printing belt.

BRIEF DESCRIPTION OF THE DRAWINGS

The invention will become apparent from the following description of a preferred embodiment of an apparatus carrying out a method for bonding a printing plate onto an flexible endless printing belt, taken in conjunction with the accompanying drawings.

FIG. 8 (*b*) is a top plan view of a transparent plate on which printing plate having on its rear surface pressure sensitive adhesive double coated tapes is placed at an intersection of a third and a transverse reference lines thereof;

FIG. 9 (*b*) is a side view similar to FIG. 9 (*a*);

FIG. 10 (*b*) is a side view of FIG. 10 (*a*) and similar to FIG. 9 (*b*);

FIG. 11 (*b*) is a side view of FIG. 11 (*a*);

FIG. 12 (*b*) is a side view of FIG. 12 (*a*);

FIG. 13 (*b*) is a side view of FIG. 13 (*a*); and

DESCRIPTION OF PREFERRED EMBODIMENT

A preferred embodiment of an apparatus carrying out a method for bonding a printing plate onto an endless film according to the invention will be described with reference to the accompanying drawings.

Figure 1:
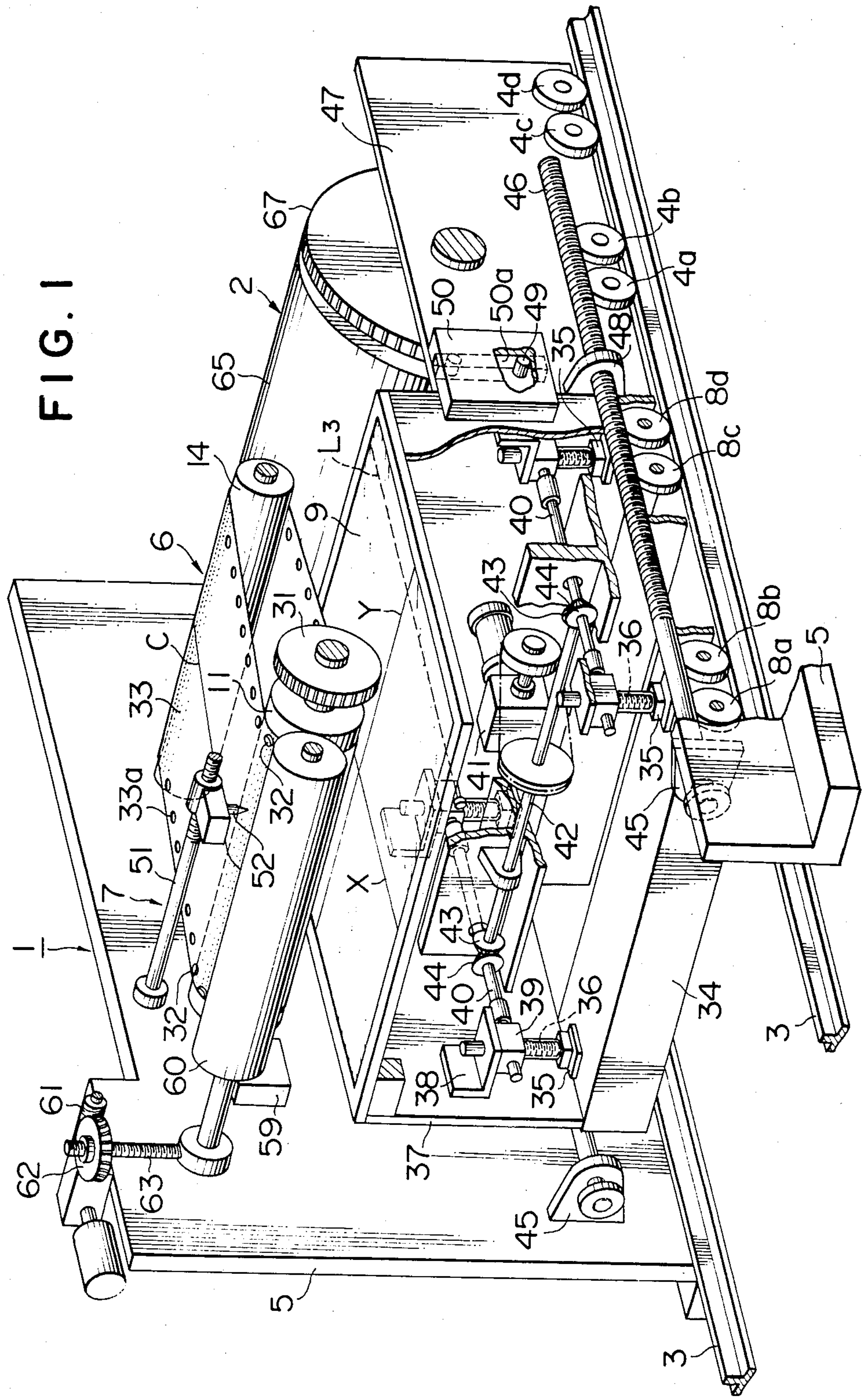
FIG. 1 is a perspective view of a printing plate bonding apparatus for carrying out a method for bonding a printing plate onto a flexible endless printing belt according to the present invention, said apparatus including an impression cylinder assembly operatively connected thereto.

Referring to FIG. 1 of the drawings, there is shown a plate bonding apparatus generally indicated at reference numeral 1 in combination with an impression cylinder assembly generally indicated at reference numeral 2 and used to test print in order to make sure whether or not there is a printing mottle occurring on each of a set of flexible printing belts for multi-color printing after completion of bonding of a flexible printing plate thereonto. The plate bonding apparatus 1 and impression cylinder assembly 2 comprise carriages 34 and 47 supported on rails 3, 3 by means of wheels 4*a* to 4*d* and 8*a* to 8*d* thereon, respectively, and adapted to move along the rails.

As best seen in FIG. 1, the plate bonding apparatus 1 comprises a belting assembly 6 and a marking assembly 7 positioned between upstanding stationary frames 5 and 5 located along the rails 3 and 3 on its adjacent sides, a horizontal transparent plate 9 positioned on the carriage 34 at its top and a reference line $L_3$ in the form of a wire movably carried below the transparent plate 9 by the carriage 34.

Figure 4:
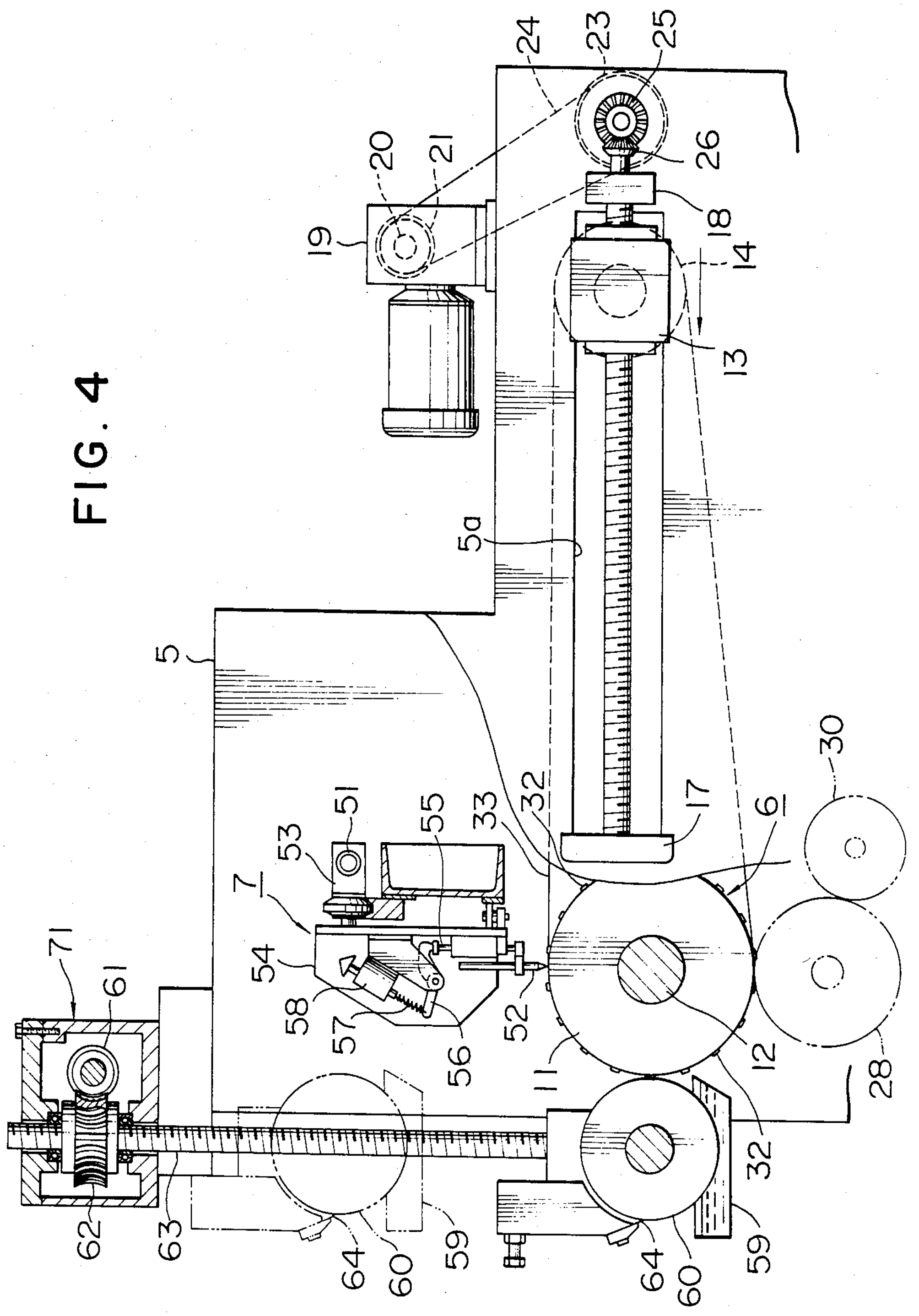
FIG. 4 is a side view of a belting assembly and a mechanism for moving an inking roller between its inking and retracted positions.
Figure 5:
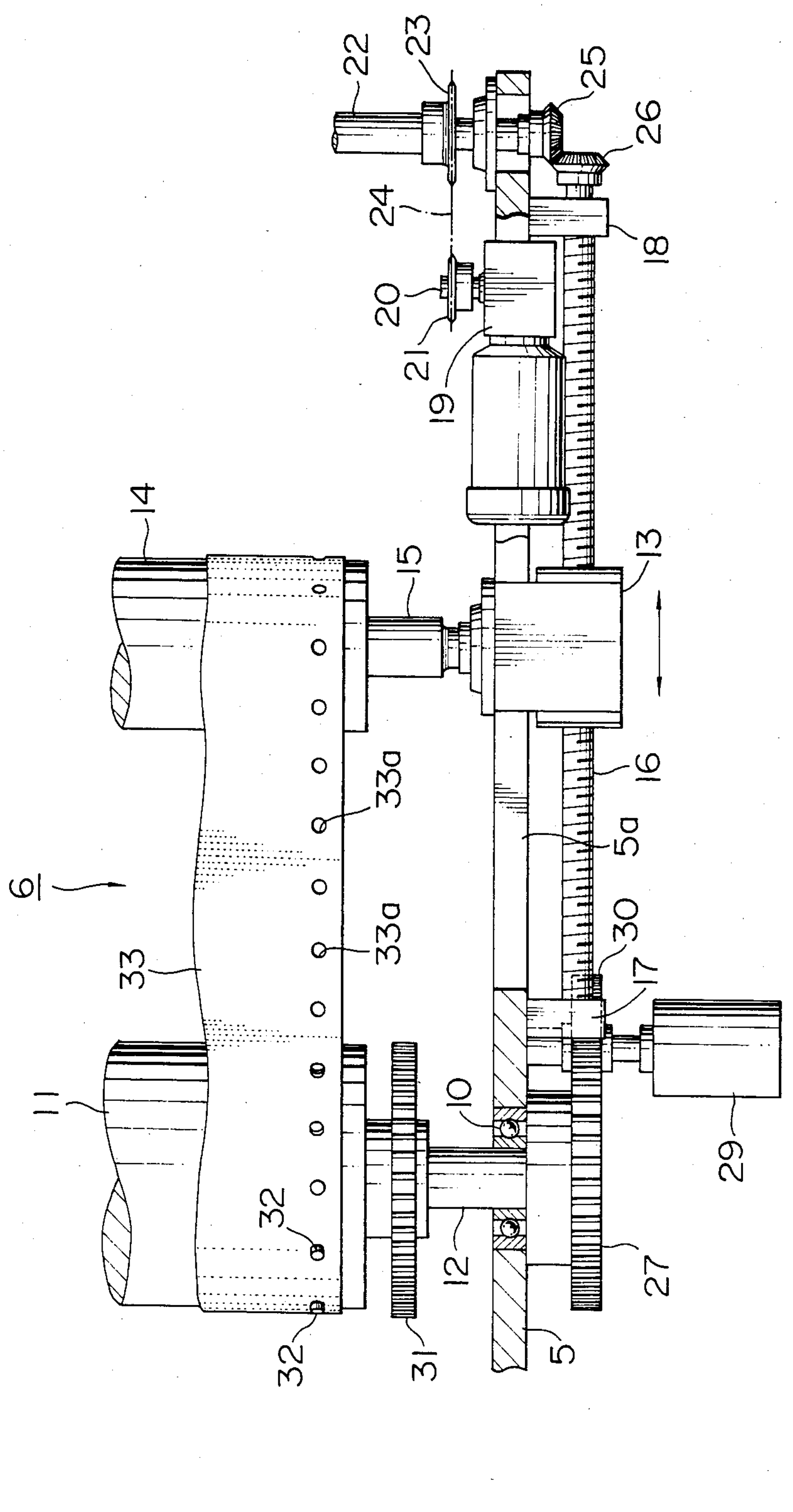
FIG. 5 is a fragmental top plan view of the belting assembly showing a mechanism for adjusting a distance between axes of the plate and adjustable cylinders thereof.

The details of the belting assembly 6 are shown in FIGS. 1, 4 and 5. The assembly 6 includes a plate cylinder 11 of any desired diameter having journals 12 rotatably supported in bearings 10 and 10 which are secured to the stationary frames 5 and 5 at their upper position. Formed in each of the frames 5 is a rectangular horizontal guide slot 5*a* in which a slider 13 is slidably received. An adjustable cylinder 14 less than the diameter of the plate cylinder 11 has journals 15 rotatably supported in bearings (not shown) positioned in the sliders 13 and 13.

FIG. 5 shows a mechanism for moving the adjustable cylinder 14 toward and away from the plate cylinder 11 to adjust a distance between the axes of the cylinders 11 and 14. This mechanism includes a horizontal threaded shaft 16 located outside of each of the frames 5 and threadedly received in a portion of the slider 13 which extends outwardly of the guide slot 5*a*. The threaded shaft 16 is rotatably supported at its one end in a bracket 17 fixed to the frame 5 and held against longitudinal movement thereof. Another bracket 18 is provided on the frame 5 for rotatably supporting the threaded shaft adjacent its other end. A motor - driver reduction gear 19 is disposed on the top of one of the frames 5 and includes an output spindle 20 having a sprocket 21 fixedly mounted thereon. A chain 24 is passed around and between the sprocket 21 and a sprocket 23 fixedly mounted on a shaft 22 which is rotatably supported in the frames 5 and 5. Thus, rotation from the reduction gear 19 will be transmitted to the shaft 22.

A bevel gear 25 is fixed to the shaft 22 at each of its ends and meshes with a bevel gear 26 fixed to the threaded shaft 16 at its other end to rotate the threaded shaft 16 in the clockwise or counterclockwise direction. The clockwise or counterclockwise rotation of the shaft 22 is transmitted to the threaded shafts 16 and 16 to cause the sliders 13 and 13 to move horizontally along the guide slots 5*a* and 5*a* in the frames 5 and 5, thereby moving the adjustable cylinder 14 toward or away from the plate cylinder 11. Thus, this makes it possible to adjust the distance between the axes of the cylinders 11 and 14 depending on the length of the endless printing belt 33.

As shown in FIGS. 4 and 5, a drive for the belting assembly 6 comprises a motor 29 having a pinion 30 which meshes through an intermediate gear 28 with a spur gear 27 fixed to a portion of the journal 12 on the plate cylinder 11, which extends outwardly through the frame 5. Thus, the plate cylinder 11 is rotatively driven by the motor 29 to travel the endless printing belt 33 in the required direction.

Figure 6:
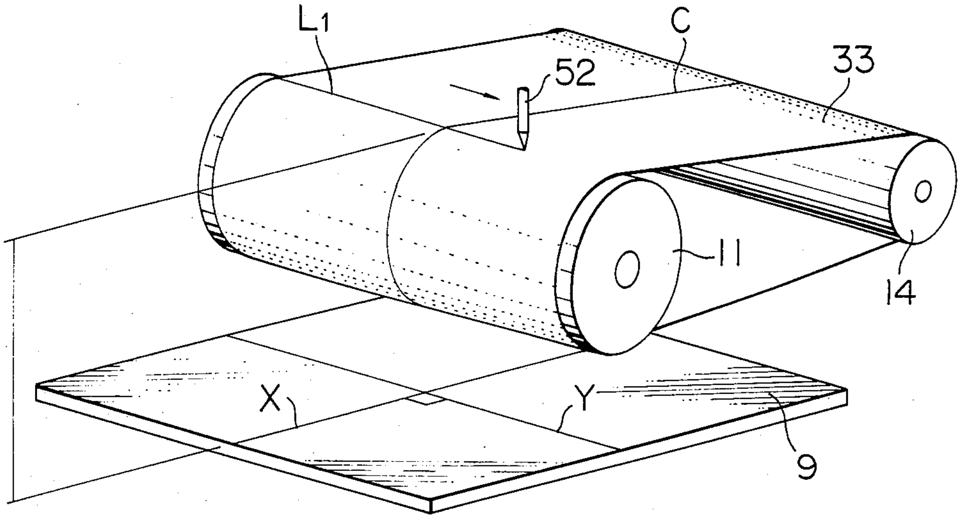
FIG. 6 is a views schematically showing a process for marking a first reference line on the surface of the printing belt by means of a pen, the reference time being perpendicular to the center line of the printing belt.

A plurality of circumferentially spaced pins 32 projects radially of the cylindrical surface of the plate cylinder 11 adjacent its ends to engage perforations 33*a* formed in the endless printing belt 33 along its edges. The printing belt 33 may be made of a sheet of synthetic resin and formed in the endless form by joining the ends of the sheet to each other by means of a pressure sensitive adhesive double coated tape (not shown) after the printing belt 33 has been passed around the plate and adjustable cylinders 11 and 14. The printing belt 33 has a longitudinal center line C printed or marked on the outer surface thereof as shown in FIG. 6.

Figure 2:
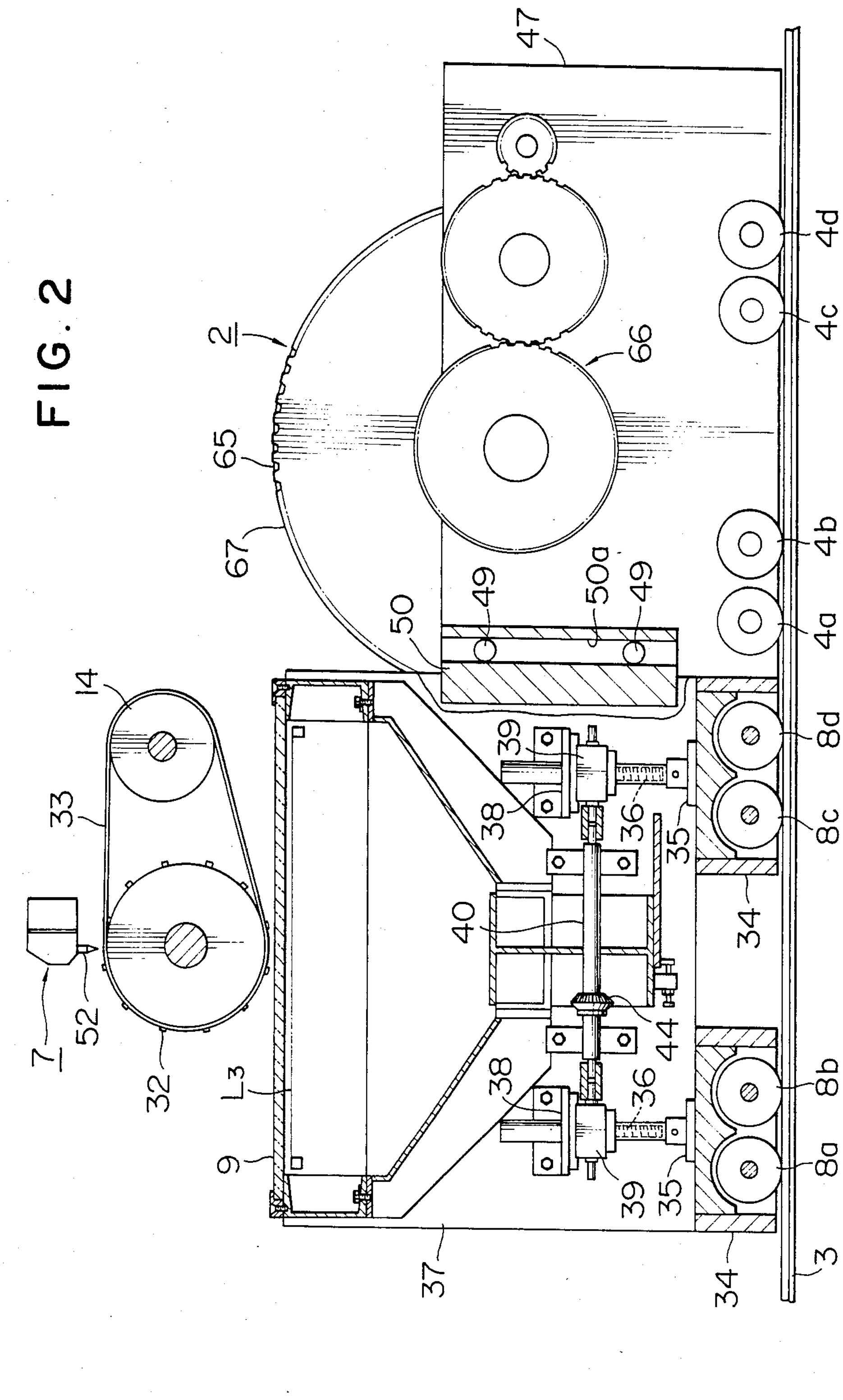
FIG. 2 is a side elevational view of the printing plate bonding apparatus and impression cylinder assembly, but showing them in section.

As seen in FIGS. 1 and 2, the carriage 34 has supports 35 fixed thereto adjacent the corners and a rectangular box-type frame 37 formed by four side panels and removably disposed on the carriage 34. A load of the frame 37 is imposed on the supports 35 through jack units 39 attached to L-shaped brackets 38 which are secured to the frame 37 on its inner surface. Operation and structure of jack units 39 will be described herebelow.

The horizontal transparent plate 9 is made of tempered glass and positioned in an upper opening of the box-type frame 37. A longitudinal reference line X and a transverse reference line Y perpendicular to the reference line X are provided on the outer surface of the transparent plate 9 by means of printing, etching or the like, as shown in FIG. 6. Preferably, the lines X and Y are arranged so that their intersection is positioned at the center of the transparent plate 9.

Each of the jack units 39 includes vertical threaded rod 36 secured at its upper portion to the bracket 38 and extending into the support 35, a worm wheel threadedly fitted over the threaded rod 36 rotatably received within a casing of the support 35 but held against longitudinal movement thereof relative to the rod 36 and a worm meshing with the worm wheel and fixed to a horizontal longitudinal shaft 40 at each of its ends. A reduction geared motor 41 is disposed in the frame 37 to transmit rotative drive through a belt and pulley assembly to a transverse shaft 42 rotatably supported in the frame in any suitable manner. The shaft 42 is provided with bevel gears 43 fixed thereto at the ends and meshing with bevel gears 44 fixed to the longitudinal shafts 40 at a position intermediate thereof. The rotation of the transverse shaft 42 is transmitted through the longitudinal shafts 40, 40 to the worms of the jack units 39 to rotate worm wheels. The rotation of the worm wheels cause the four threaded rods 36 to move vertically in unison, thereby lifting the frame 37 and the transparent plate 9 carried thereby relative to the carriage 34. The stroke of movement of the frame 37 and its transparent plate 9 may be set to a sufficient distance to move a printing plate on the transparent plate 9 into contact with the printing belt 33 (see FIG. 11 (*a*)).

Figure 3:
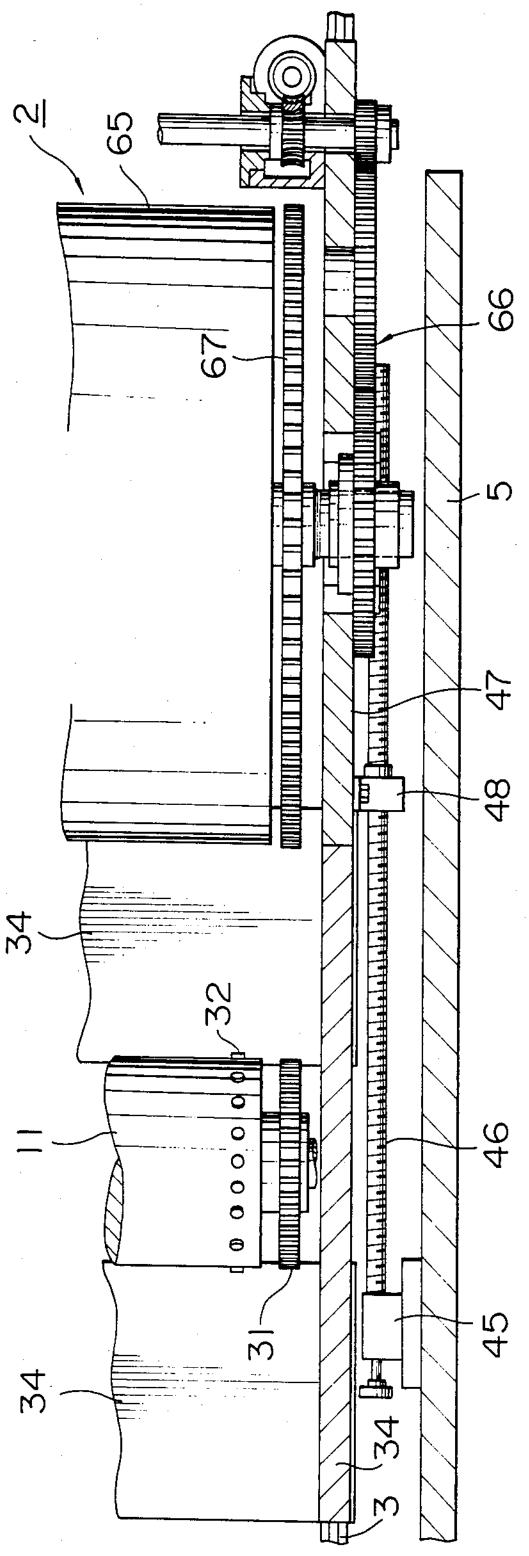
FIG. 3 is a fragmental top plan view of the printing plate bonding apparatus and impression cylinder assembly showing a mechanism for moving them along rails.

As described above, the carriage 34 is adapted to be moved along the rails 3 and 3 by means of wheels 8*a* to 8*d* mounted thereon. As seen in FIGS. 1 and 3, a long horizontal threaded shaft 46 is rotatably supported at its one end in a bracket 45 secured to the inside of each of the stationary frames 5 and threadedly received in a bracket 48 secured to the outside of the frame 37 on the carriage 47 of the impression cylinder assembly 2. A source of drive (not shown) is coupled to threaded shaft 46 to selectively rotatively drive it clockwise or counterclockwise so that the bracket 48 can be moved along the threaded shaft 46. Carried by the carriage 47 on its each side is a pin 49 which is received in a vertical slot 50*a* in a connector plate 50 secured to the frame 37 to connect the carriages 34 and 47 to each other. This arrangement makes it possible not only to move carriage 34 together with the carriage 47 along the rails, but also to move vertically the box-like frame 37 relative to the carriage 34.

The third reference line $L_3$ which comprises a piano wire in tension, is located horizontally below the transparent plate 9 and adapted to be movable toward and away from the longitudinal reference line X on the upper surface of the transparent plate 9 in the relation parallel to the reference line X. To this end, there are two spaced transverse guide rails (not shown) positioned horizontally on the frame 37 below the transparent plate 9 and having sliders (not shown) slidably mounted thereon, between which the piano wire is secured under tension. The sliders are adapted to be driven along the guide rails by means of wires and stepping motor (not shown). The existence of the third reference line $L_3$ can be easily ascertained through the transparent plate 9 from its top.

Positioned above the belting assembly 6 is the assembly 7 for marking the first and second reference lines $L_1$ and $L_2$ on the surface of the printing belt 33 at its required positions. A horizontal transverse guide threaded rod 51 is carried between the opposite stationary frames 5 and 5 above the plate cylinder 11 of the belting assembly 6 and has a slider 53 threadedly engaging thereon. The slider 53 has a marking ball pointed pen 52 carried thereby. As shown in detail in FIG. 4, the slider 53 includes a support plate 54 on which a spring-loaded slidable rod 55 is supported for vertical movement. The marking pen 52 is carried by the slidable rod 55 with the tip directed downwardly. There is provided a pivotable lever 56 having its one end engaging the slidable rod 55. The lever 56 is connected at its other end through a coil spring 57 to a plunger of a solenoid 58. The marking pen 52 is usually urged to its rised position under action of the spring (not shown), in which it is spaced apart from the printing belt 33 on the plate cylinder 11. When the solenoid 58 is energized, the pen 52 can be lowered through the lever 56 and slidable rod 55 into contact with the printing belt 33.

The slider 53 may be moved along the threaded guide rod 51 under their screw motion by a stepping motor (not shown) associated with the threaded guide rod 51.

The marking pen 52 is arranged so that the tip of the pen 52 lies in a vertical plane passing through the axis of the plate cylinder 11 when the pen 52 is in contact with the printing belt 33 on the plate cylinder 11. With this arrangement, as shown in FIG. 6, the marking pen 52 can mark on the printing belt the first reference line $L_1$ perpendicular to the center line C of the printing belt 33 by moving the slider 53 along the guide rod 51. The plate cylinder 11 of the belting assembly 6 can be rotated to travel the endless printing belt 33 in order to set a position in which the first reference line $L_1$ is marked on the printing belt 33. During the marking operation, of course, the printing belt 33 remains stopped.

Figure 7:
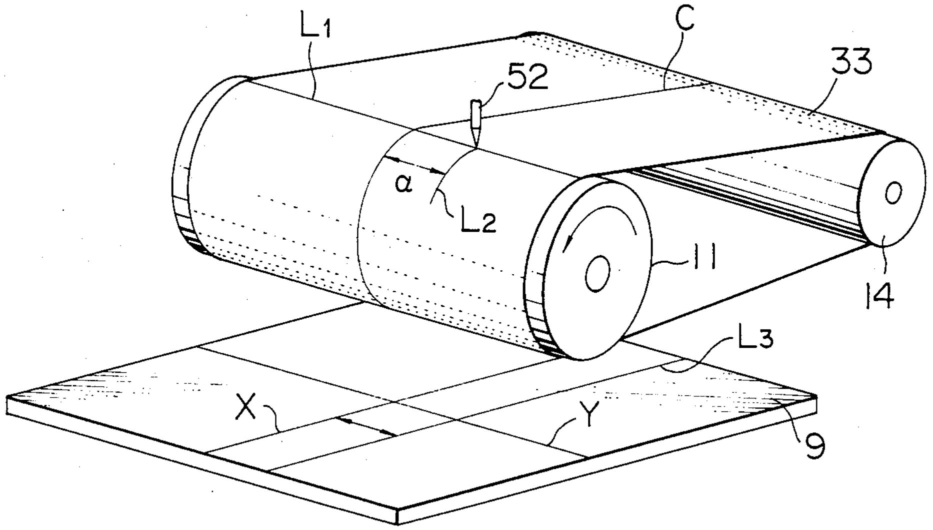
FIG. 7 is a view schematically showing a process for marking a second reference line on the surface of the printing belt, the second reference line being spaced apart from the center line a required distance.

When the pen 52 is in its raised position, it is moved transversely relative to the center line C a desired distance $\alpha$, as shown in FIG. 7. Then, the pen 52 is lowered toward the printing belt 33 until it comes into contact with the belt 33 and then, rotation of the plate cylinder in the arrowed direction causes the pen 52 to mark on the printing belt 33 the second reference line $L_2$ parallel to the center line C and spaced apart from it distance $\alpha$.

As best seen in FIG. 4, an ink pan 59 is disposed adjacent the plate cylinder 11 and extends along it. An inking roller 60 is provided in the ink pan 59 to transfer flexographic ink from the ink pan to a printing plate on the printing belt 33 around the plate cylinder 11 for test printing after completion of bonding the printing plate 68 to the printing belt 33. The inking roller 60 with the ink pan 59 is adapted to be moved to an upwardly retracted position except when there is need for the test printing. To this end, a gear box 71 is positioned on the stationary frame at its top and includes a rotating worm 61 fixed to an output thereof and meshed with a worm wheel 62 in which a vertical threaded rod 63 is threadedly received. Rotation of the worm wheel 62 causes the threaded rod 63 to move vertically under their screw motion, thereby moving the inking roller 60 between its positions shown in solid and dotted line in FIG. 4. A doctor blade 64 is provided for regulating an amount of ink applied onto the inking roller 60.

Impression cylinder assembly 2 comprises an impression cylinder 65 rotatably mounted on the carriage 47 and having a circumferential length identical to or slightly longer than the whole length of the endless printing belt 33 to be passed around the plate cylinder 11 and adjusting cylinder 14 spaced apart from each other an maximum distance. For test printing, the carriage 47 is moved along the rails until the impression cylinder 65 is brought to the position just below the plate cylinder 11. There is provided an eccentrically driving mechanism (not shown) making it possible to adjust a pressure of contact of the impression cylinder 65 with the printing plate on the printing belt 33. A gear train 66 forms part of such a mechanism (see FIGS. 2 and 3). The impression cylinder 65 is provided with a large spur gear 67 fixedly secured to the journal thereof and meshing with the spur gear 31 fixedly secured to the journal 12 of the plate cylinder 11 to transmit rotation from the plate cylinder 11 to the impression cylinder 65 in synchronized relationship with the plate cylinder 11.

Figure 8A:
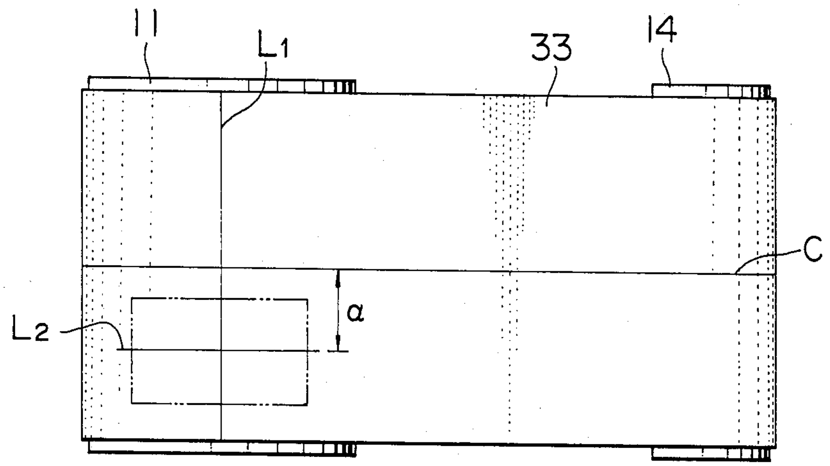
FIG. 8 (*a*) is a top plan view of the printing belt having the first and second reference lines marked thereon.
Figure 8B:
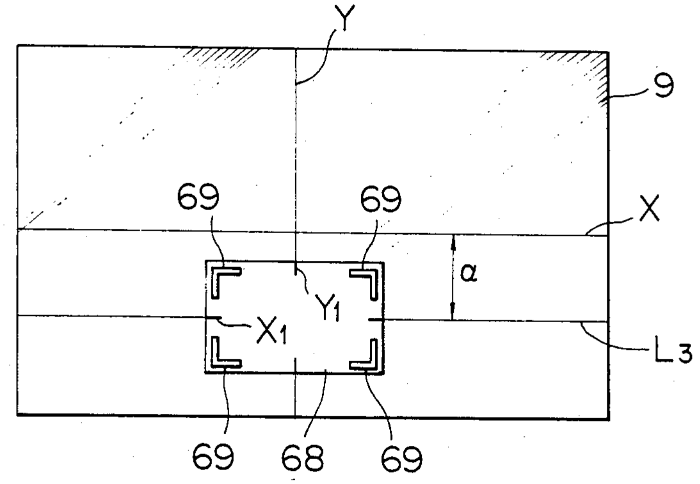

Operation of the apparatus according to the invention will be described herebelow to show how to bond the printing plate to the endless printing belt. The printing plate 68 has on its rear surface previously marked longitudinal reference and transverse reference lines $X_1$ and $Y_1$ perpendicularly intersecting each other at the central point of the plate 68, as shown in FIG. 8 (*b*). When the plate 68 is placed on the transparent plate 9 with the rear surface thereof directed upwardly, it is positioned on the transparent plate 9 by alignment of the longitudinal and transverse reference lines $X_1$ and $Y_1$ on the printing plate with the third and transverse reference lines $L_3$ and Y below and on the transparent base plate, respectively. The printing plate 68 also has on its rear surface means for adhering the printing plate 68 onto the transparent plate 9, such as pressure sensitive double coated tapes 69 adhered thereto at any desired positions of the rear surface. As well known in the art, the adhesive on the tapes may be covered by sheets of releasing paper for protection thereof. Therefore, the sheets of releasing paper will be removed prior to use.

As shown in FIG. 6, the pen 52 of the marking assembly 7 marks on the endless printing belt 33 the first reference line $L_1$ perpendicular to the center line C of the endless printing belt 33 by lowering the pen 52 toward the printing belt 33 and moving tranversely the slider 53 along the guide rod 51.

As shown in FIG. 7, the second reference line $L_2$ is then marked on the endless printing belt 33 so that it is spaced apart from the center line C a required distance $\alpha$ in parallel with the center line C. Namely, operation of the marking assembly causes the slider 53 to move along the guide rod 51, thereby bringing the pen 52 to a position spaced apart from the center line C of the printing belt 33 the required distance $\alpha$ while the pen 52 is in its raised position. Then, the solenoid 58 is energized to lower the pen 52 into contact with the upper surface of the printing belt 33 around the plate cylinder 11. As seen in FIG. 5, the motor 29 is rotated to rotatabely drive the plate cylinder 11 in the counterclockwise direction, thereby travelling the endless printing belt 33 in the same direction. Thus, the marking of the second reference line $L_2$ on the printing belt 33 by the pen 52 is accomplished so that the line $L_2$ intersects the first reference line $L_1$. During the marking operation, the carriages 34 and 47 are in their position shifted to the right for facilitating access to the pen 52.

After marking of the first and second reference lines $L_1$ and $L_2$ on the printing belt 33, the carriage 34 and 47 are moved to the left so that the plate 9 is away from the belting assembly 6. The third reference line $L_3$ below the transparent plate 9 is moved horizontally transversely to a required position in parallel with the longitudinal reference line X on the transparent plate 9. The distance between the third and longitudinal reference lines $L_3$ and X is set to be equal to the required distance $\alpha$ between the center and the second reference lines C and $L_2$. It will be noted that since the center line C and the longitudinal reference line X align vertically with each other, the second and third reference lines $L_2$ and $L_3$ also become aligned vertically with each other. The third reference line $L_3$ may be operated either after the marking of the second reference line 2 has been made or in harmonized relationship with marking of the second reference line $L_2$.

As shown in FIGS. 8 (*a*) and (*b*), the printing plate 68 with the pressure adhesive double coated tapes 69 adhered to the rear surface thereof is then placed on the transparent plate with the rear surface directed upwardly so that the perpendicularly intersecting longitudinal and transverse reference lines $X_1$ and $Y_1$ on the rear surface of the plate 68 align with the third and transverse reference lines $L_3$ and Y viewed through and lying on the transparent plate 9. After the printing plate 68 has been positioned on the transparent plate 9 in such a manner as described above, the releasing sheets are removed from the adhesive double coated tapes on the rear surface of the printing plate 68 for exposure of the adhesive surfaces.

Figures 9A, 9B, 10A, 10B:
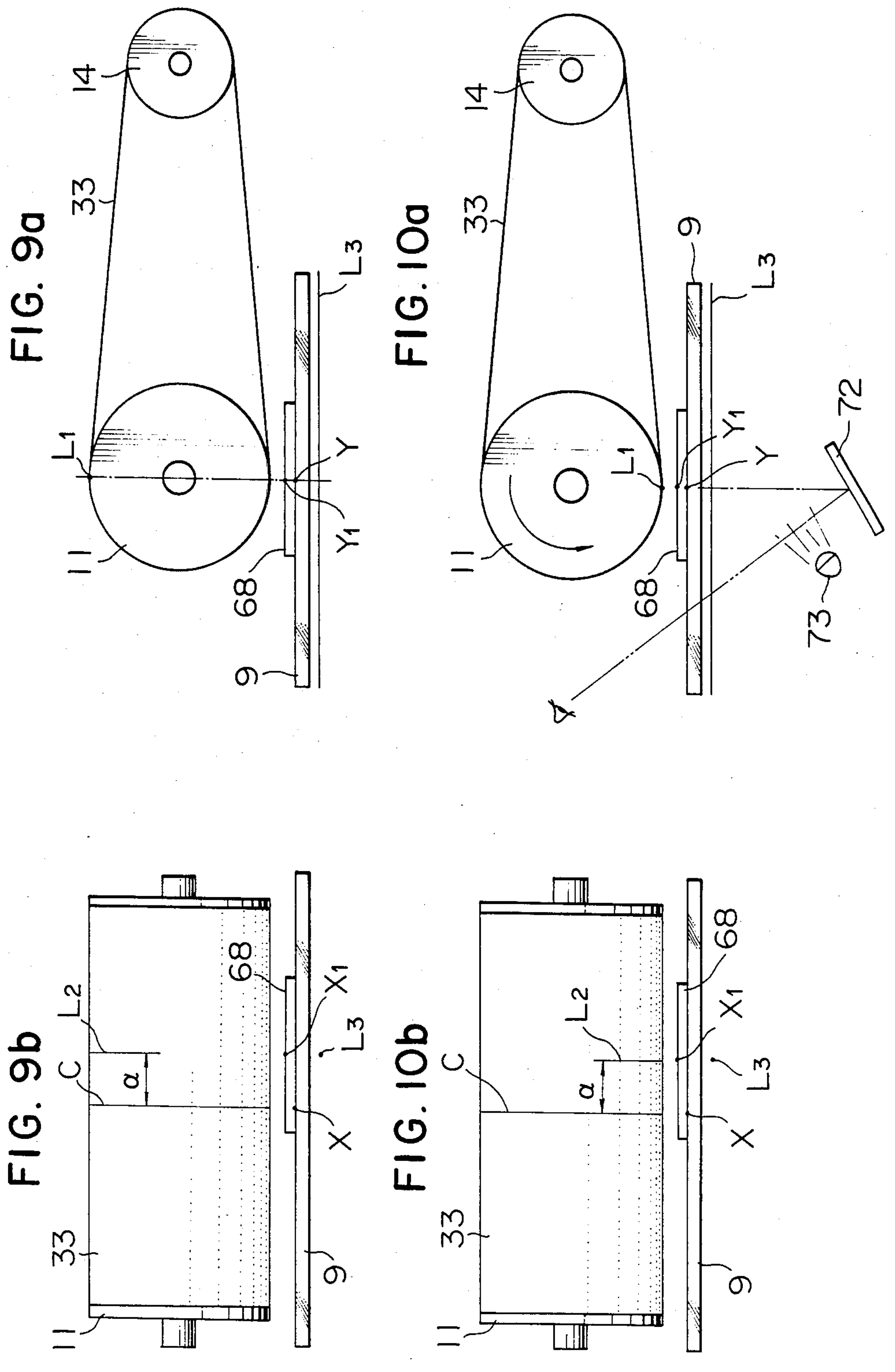
FIG. 9 (*a*) is a view of the printing belt and the transparent plate schematically showing a vertical alignment of the first marked reference line of the printing belt and the transverse reference line of the transparent plate.
FIG. 10 (*a*) is a view similar to FIG. 9 (*a*) but showing the printing belt with the first marked reference line brought to a position just above the transverse reference line of the transparent plate by rotating the plate cylinder to travel the belt.

By rotating the threaded shaft 46 threadedly interacting with the bracket 48, the carriages 34 and 47 are moved along the rails 3 to the right so that the transparent plate is positioned just below the plate cylinder 11 of the belting assembly 6 to a position in which the transverse reference line Y on the upper surface of transparent plate 9 aligns vertically with a plane passing between the axis of the plate cylinder 11 and the first reference line $L_1$ marked on the upper surface of the printing belt 33, as shown in FIGS. 9 (*a*) and (*b*). The motor 29 is then actuated to rotatively drive the plate cylinder 11 in the counterclockwise direction for an angle of 180° so that the endless printing belt 33 is travelled to a position of alignment of the first reference line $L_1$ thereon with the transverse reference line Y on the transparent plate 9, as shown in FIGS. 10 (*a*) and (*b*). In order to facilitate making sure whether or not the reference lines $L_1$ and Y are aligned vertically with each other, a mirror 72 inclined at any desired angle may be provided below the transparent plate 9. With this arrangement, an operator can view through the transparent plate 9 an image reference lines $L_1$ and Y produced on the mirror 72. There may be provided an illuminating light indicated at reference numeral 73.

Figure 11A:
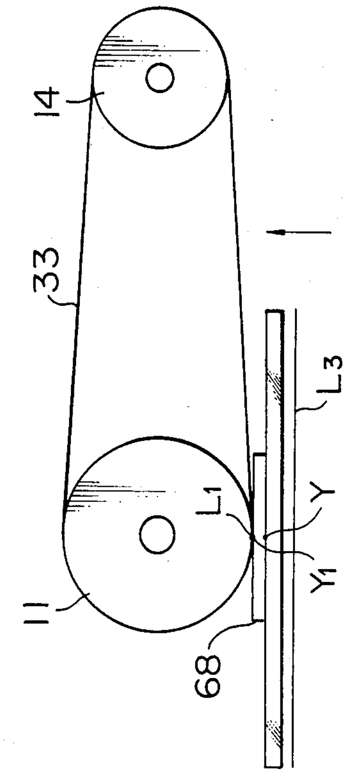
FIG. 11 (*a*) is a front view of the printing belt and transparent plate, the latter being lifted toward the printing belt to bring the printing plate into contact with the printing belt.
Figure 11B:
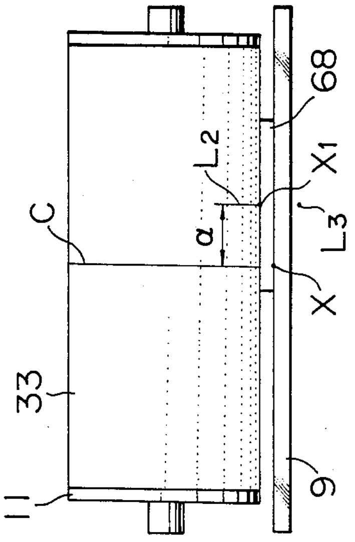

As shown in FIGS. 11 (*a*) and (*b*), the box-like frame 37 and hence the transparent plate 9 are lifted toward the endless printing belt 33 to bring the printing plate 68 into contact with the belt 33. It will be understood that at this point, the alignment of the transverse reference line $Y_1$ on the rear surface of the printing plate 68 with the first reference line $L_1$ on the printing belt 33 is still maintained. The lifting of the box-like frame 37 with the transparent plate 9, from the carriage 37 is achieved by moving upwardly the threaded rods 36 through the jack units 39 which are operated from the reduction geared motor 41 through the shafts 42 and 40. During the upward movement of the box-like frame 37, the latter can be moved upwardly relative to the carriage 47 of the impression cylinder assembly 2 through the connector place 50 having the vertical slot 50*a* engaging the pin 49 on the carriage 47, while the frame 37 remains connected to the carriage 47.

Figure 12A:
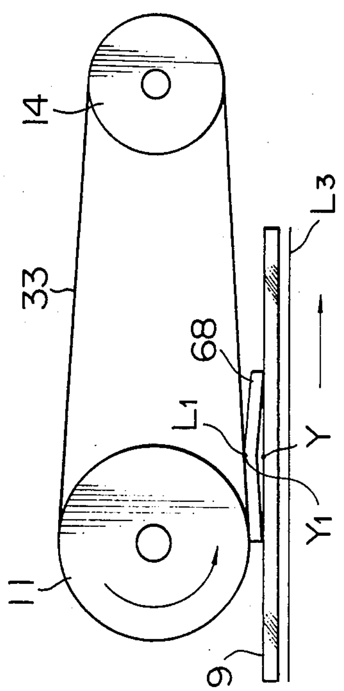
FIG. 12 (*a*) is a view similar to FIG. 11 (*a*) but showing a process in which a half of the printing plate is bonded to the printing belt by moving the belt and the transparent plate in one of the directions of rotation of the plate cylinder in a synchronized relation.
Figure 12B:
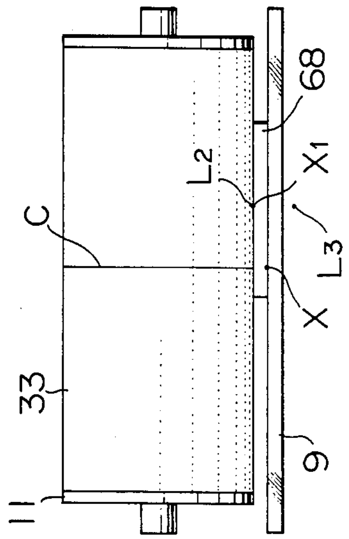
Figure 13A:
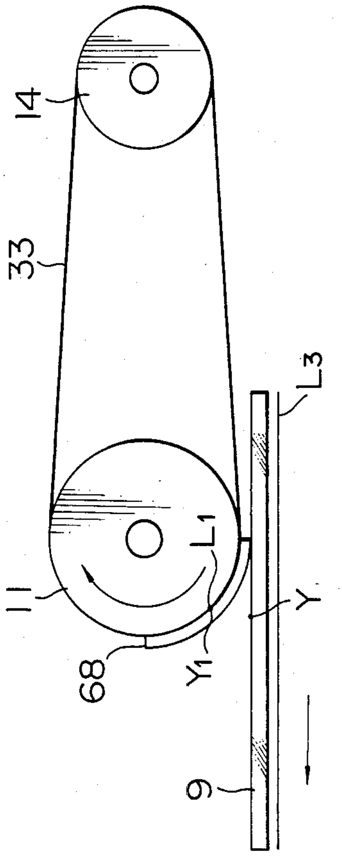
FIG. 13 (*a*) is a view similar to FIG. 12 (*a*) but showing the printing belt and transparent plate which are moved in the other direction to bond the remaining half of the printing plate to the printing belt.
Figure 13B:
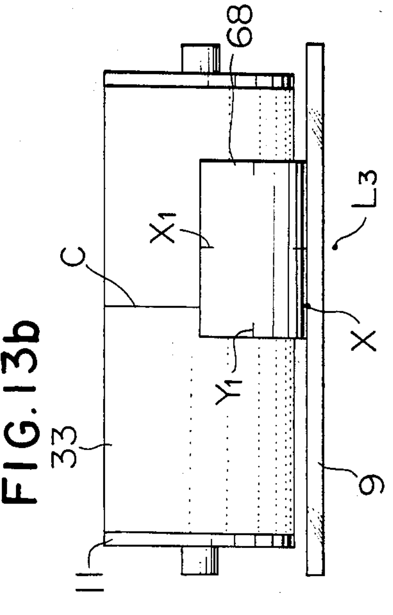
Figure 14:
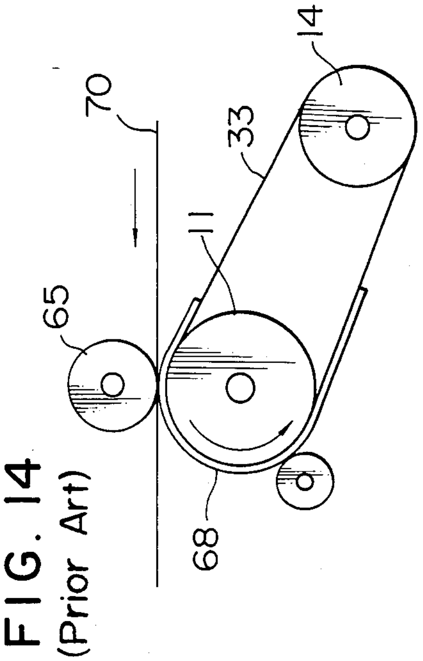
FIG. 14 (Prior Art)
FIG. 14 is a schematic view of a belt-type printing machine.

When the printing plate 68 is in contact with the printing bell belt 33, the plate cylinder 11 is rotated counterclockwise to travel the endless printing belt 33 in the same direction, as shown in FIGS. 12 (*a*) and (*b*). The carriage 34 and hence, the transparent plate 9 is moved in the same direction as that of movement of the lower run of the printing belt 33 in the synchronized relation therewith so that the left-hand half of the printing plate 86 from the transverse reference line $Y_1$ is bonded to the printing belt 33 by means of adhesive of the tapes 69 on the rear surface thereof. As seen in FIGS. 13 (*a*) and (*b*), then, the plate cylinder 11 is rotated clockwise to travel the endless printing belt 33 in the same direction while the transparent plate 9 is moved in the same direction as that of movement of the lower run of the belt 33 in the synchronized relation therewith. This results in bonding of the remaining right-hand half of the printing plate 9 to the printing belt 33 by means of adhesive of the tapes on the rear surface thereof. Thus, the bonding operation is completed.

After completion of the bonding operation, the vertical threaded rods 36 are lowered by reversely operating the jack units 39 from the reduction geared motor 41, in unison to move downwardly the box-like frame 37 to its lowermost retracted position.

A test printing will be carried out in the following process for a check of the condition of the printing plate bounded to the printing belt. In case of a set of endless printing belts for multi-color, each printing belt having a printing plate bonded thereto in the same arrangement, such a test printing will likewise be carried out to make sure whether or not printing mottles occur between the respective printing belts. As shown in FIG. 4, the threaded rod 63 is moved downwardly under the screw action by the rotating worm wheel 62 meshing with the worm 61 as the latter is rotated so that the inking roller 60 is brought to its inking position adjacent the plate cylinder 11 of hte belting assembly 6. Then, the carriages 34 and 47 are moved to the left along the rails 3 and 3 until the impression assembly 2 is brought just below the belting assembly 6. At this point, the spur gear 67 of the impression cylinder 65 is meshed with the spur gear 31 on the journal 12 of the plate cylinder 11 of the belting assembly 6. The impression cylinder 65 comes into contact with the printing plate. A printing sheet of paper (not shown) is bonded to the peripheral surface of the impression cylinder 65.

Then, the motor 29 is actuated to rotate the plate cylinder 11 so that the impression cylinder 65 can be rotatively driven synchronously. Ink is transferred from the inking roller 60 onto the printing plate 68 on the printing belt 33, by which the sheet of paper on the impression cylinder 65 is printed. Thus, by checking the condition of print produced on the printing sheet of paper, it is possible to ascertain certain the plate bonding condition of the printing belts and the printing mottles occuring between the printing belts for multi-color printing.

It will be noted from the foregoing the present invention has provided the method and apparatus for bonding the printing plate onto the endless printing belt, in which the printing plate can be automatically precisely bonded to the endless printing belt at the required position in a mechanical manner without any need for skill and therefore, this makes it possible to efficiently conduct operation of making the endless printing belt in preparation for printing.

I claim:

1. A method for bonding a printing plate to a flexible endless printing belt (33) passed around and between a plate cylinder (11) and an adjustable cylinder (14), the latter being arranged to be capable of adjusting a distance between their axes, said printing belt (33) having a longitudinal center line (C) on the surface thereof, comprising employing a transparent plate (9) disposed below the printing belt and having on its surface longitudinal and transverse reference lines (X) and (Y) perpendicular to each other, said longitudinal reference line (X) being positioned to align vertically with said center line (C) of the printing belt (33), marking on the surface of the printing belt a first reference line ($L_1$) perpendicular to said center line (C) of said printing belt (33) and a second reference line ($L_2$) parallel to said center line and spaced apart a required distance from said center line, setting below the transparent plate a third reference line ($L_3$) parallel to said longitudinal reference line (X) of the transparent plate (9) and at a distance equal to said required distance between said center line (C) and said second reference line ($L_2$) of said printing belt (33), placing a turned over printing plate (68) on said transparent plate (9) at an intersection of said third and transverse reference lines, said printing plate (68) having on its rear surface adhesive means (69), aligning vertically said first marked reference line ($L_1$) on said surface of said printing belt (33) with said transverse reference line (Y) on the surface of said transparent plate (9), rotating said plate cylinder (11) to bring said first marked reference line ($L_1$) to a position just above said transverse reference line, moving said transparent plate (9), relative to said printing belt (33) to bring said printing plate (68) into contact with said printing belt (33) and moving said printing belt and said transparent plate first in one direction and then in the other from the position of alignment between said first reference line of the printing belt and the transverse reference line of the transparent plate (9) in a synchronized relation with each other to bond the printing plate to the printing belt by said adhesive means.

2. The printing plate bonding method as described in claim 1 wherein said printing plate is provided on its rear surface with longitudinal and transverse reference lines ($X_1$) and ($Y_1$) aligning with the third and transverse reference lines ($L_3$) and (Y) of the transparent plate, respectively, to position said printing plate (68) on the transparent plate.

3. An apparatus for bonding a printing plate to a flexible endless printing belt comprising a belting assembly (6) rotatably driven clockwise or counterclockwise and including a plate cylinder (11), an adjustable cylinder (14) arranged to be capable of adjusting a distance between axes of said cylinders, said printing belt (33) passed around and between said plate and adjustable cylinders (11) and (14), said printing belt (33) having on its surface a longitudinal center line (C), a horizontal transparent plate (9) disposed below said belting assembly for the printing plate thereon, said transparent plate having on its surface longitudinal and transverse reference lines (X) and (Y) perpendicular to each other, said longitudinal reference line aligning vertically with said center line of the belt, means for moving horizontally said transparent plate relative to said belting assembly (6), means for moving vertically said transparent plate (9) toward and away from the belting assembly (6), a third reference line ($L_3$) disposed below said transparent plate (9) and adapted to be movable toward and away from said longitudinal reference line (X) of said transparent plate (9) in parallel therewith, and a marking assembly (7) disposed above said belting assembly (6) and movable in a direction perpendicular to the center line (C) of the printing belt (33).

4. The apparatus for bonding a printing plate to an endless printing belt as described in claim 3 wherein said third reference line ($L_3$) comprises a piano wire mounted below the transparent plate for movement toward and away from the longitudinal reference line (X) thereof in parallel with the longitudinal reference line (X).

5. The apparatus for bonding a printing plate to an endless printing belt as described in claim 3 further comprising an inclined mirror (72) positioned below said transparent plate, for viewing the vertical alignment of a first marked reference line ($L_1$) on the surface of the printing belt (33) with the transverse reference line (Y) of said transverse plate (9) as the first reference line ($L_1$) is brought to a position just above the transverse reference line (Y).

* * * * *